United States Patent
Chelminski

[15] 3,699,771
[45] Oct. 24, 1972

[54] ROTARY WING AIRCRAFT LIFT AND PROPULSION METHOD AND SYSTEMS

[72] Inventor: Stephen V. Chelminski, West Redding, Conn.

[73] Assignee: Kendall G. Parmelee, Riverside, Conn.; a part interest

[22] Filed: Jan. 29, 1970

[21] Appl. No.: 6,693

[52] U.S. Cl.................................60/39.35, 60/39.27
[51] Int. Cl...............................................F02c 3/16
[58] Field of Search.........244/17.21; 60/226, 39.34, 60/39.35, 39.27; 416/20, 21, 22

[56] References Cited

UNITED STATES PATENTS

| | | | |
|---|---|---|---|
| 3,172,259 | 3/1965 | North | 60/39.27 |
| 3,255,586 | 6/1966 | Hennig et al. | 60/39.27 |
| 3,053,324 | 9/1962 | Morley | 416/21 |
| 2,594,788 | 4/1952 | Morain | 60/39.35 |
| 2,660,859 | 12/1953 | Chamberlain | 416/21 |
| 2,509,359 | 5/1950 | Margolis | 60/39.34 |
| 2,654,995 | 10/1953 | Ostroff | 416/20 |
| 2,710,067 | 6/1955 | Sforza Del Pesaro | 60/39.35 |
| 3,505,816 | 4/1970 | Wilde | 416/20 |

FOREIGN PATENTS OR APPLICATIONS

| | | | |
|---|---|---|---|
| 361,198 | 5/1962 | Switzerland | 60/39.35 |

Primary Examiner—Carlton R. Croyle
Assistant Examiner—Warren Olsen
Attorney—Bryan, Parmelee, Johnson and Bollinger

[57] ABSTRACT

A rotary wing aircraft lift and propulsion method and system in which burner thruster units mounted on the lift-producing rotor at a position spaced radially from the axis of the rotor generate moments to turn the rotor about its axis. An air compressor is driven by the rotor through a speed increasing drive and pumps air at a pressure exceeding atmospheric through ducts in the rotor extending out to the respective burner thruster units while fuel is shock in them to produce jets reflecting combustion gases generating thrust to turn the rotor about its axis. In addition to the lift-producing rotor, a propeller serves to drive the aircraft forward or backward, and the power for driving this propeller is derived from the rotation of the rotor itself. To control forward or backward motion of the craft, the propeller pitch is varied, and also it may be disengaged by use of a clutch. There is a forward-motion steering rudder and a downwash deflector rudder which are both operable by the same control for counteracting the moderate rotor torque exerted on the aircraft body and for steering the craft.

4 Claims, 12 Drawing Figures

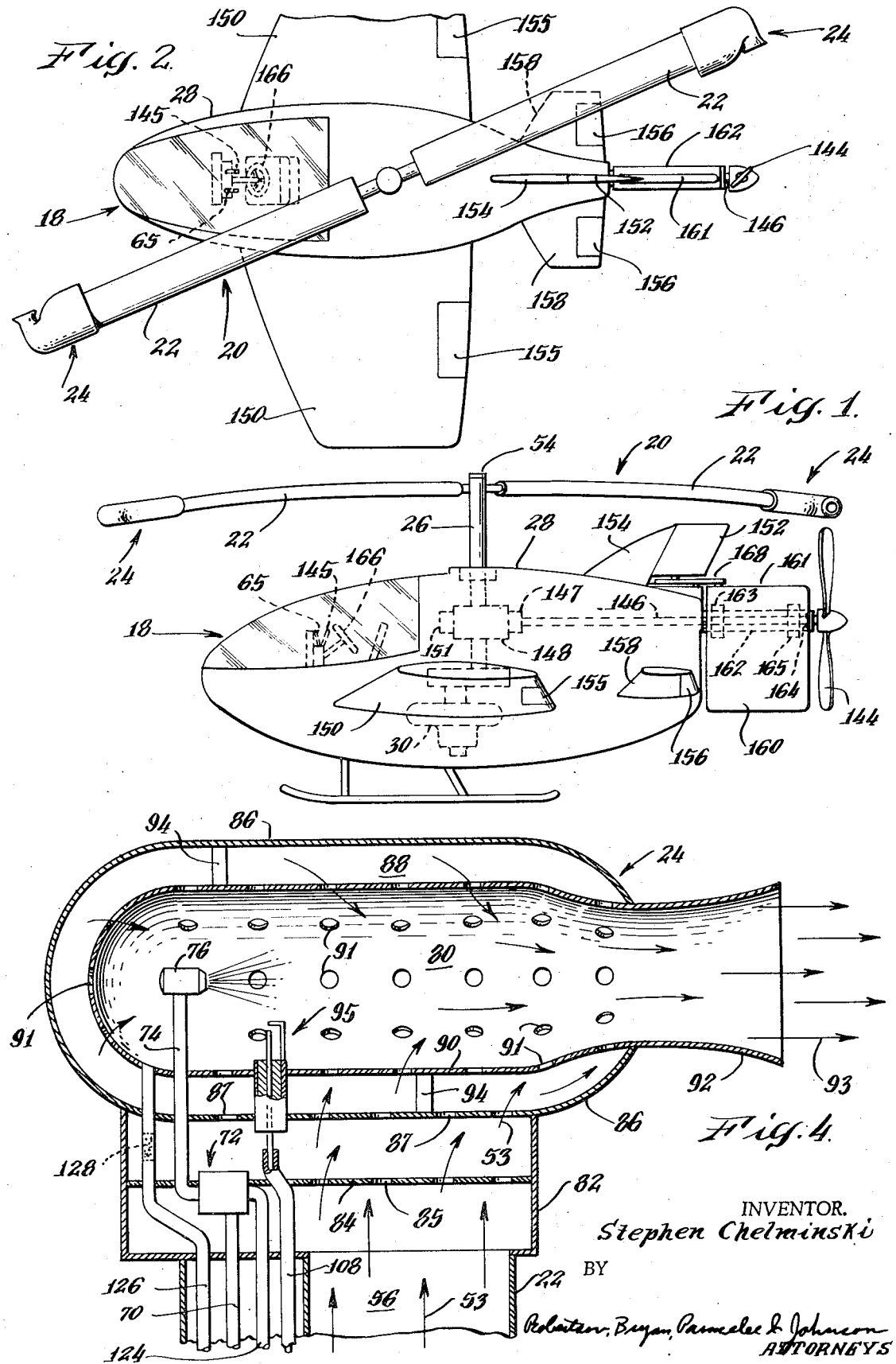

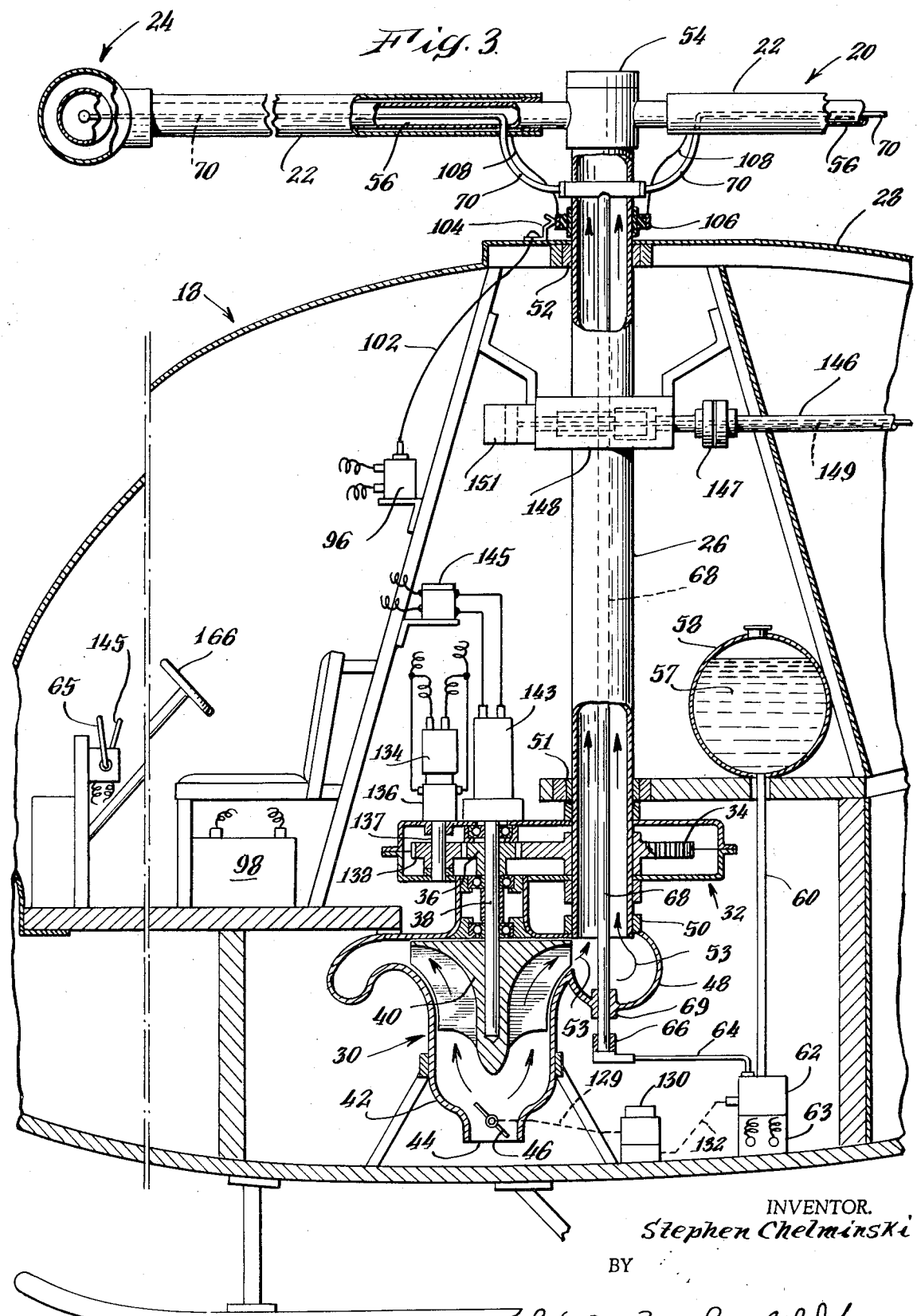

INVENTOR.
Stephen Chelminski

BY

Robertson, Bryan, Parmelee & Johnson
ATTORNEYS.

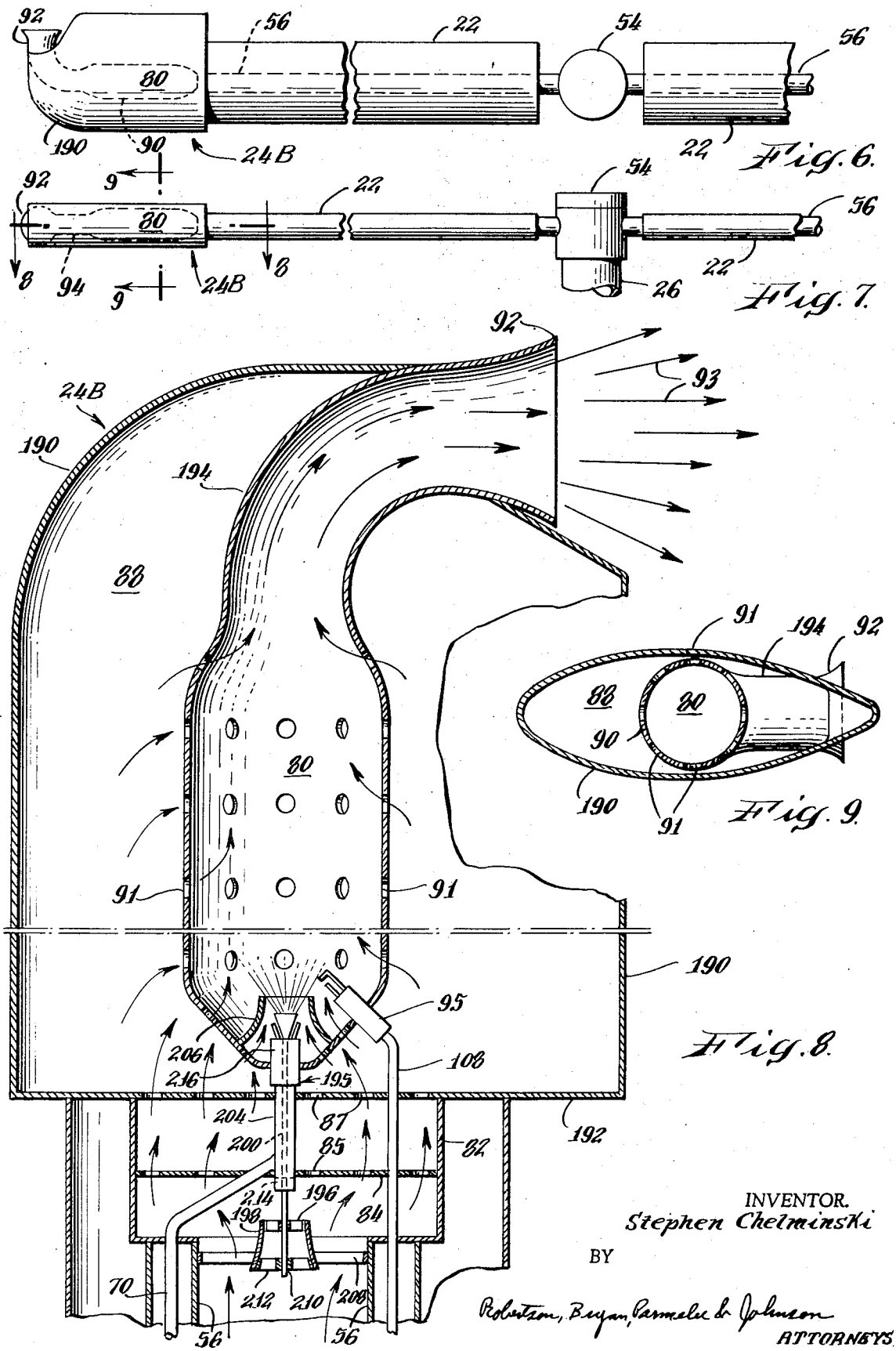

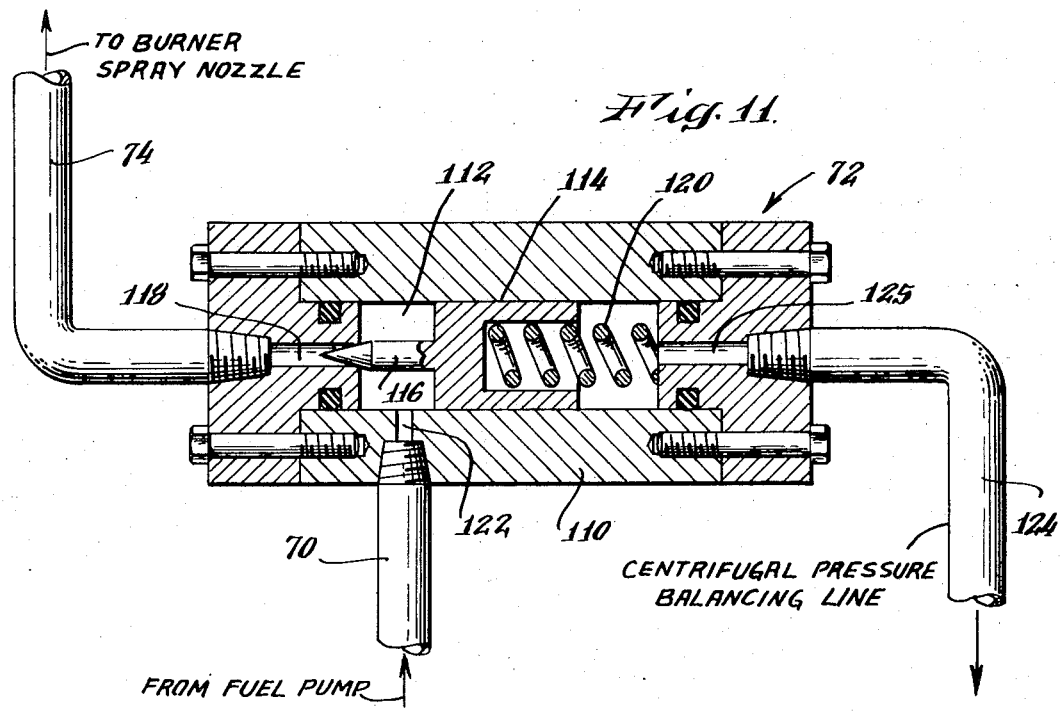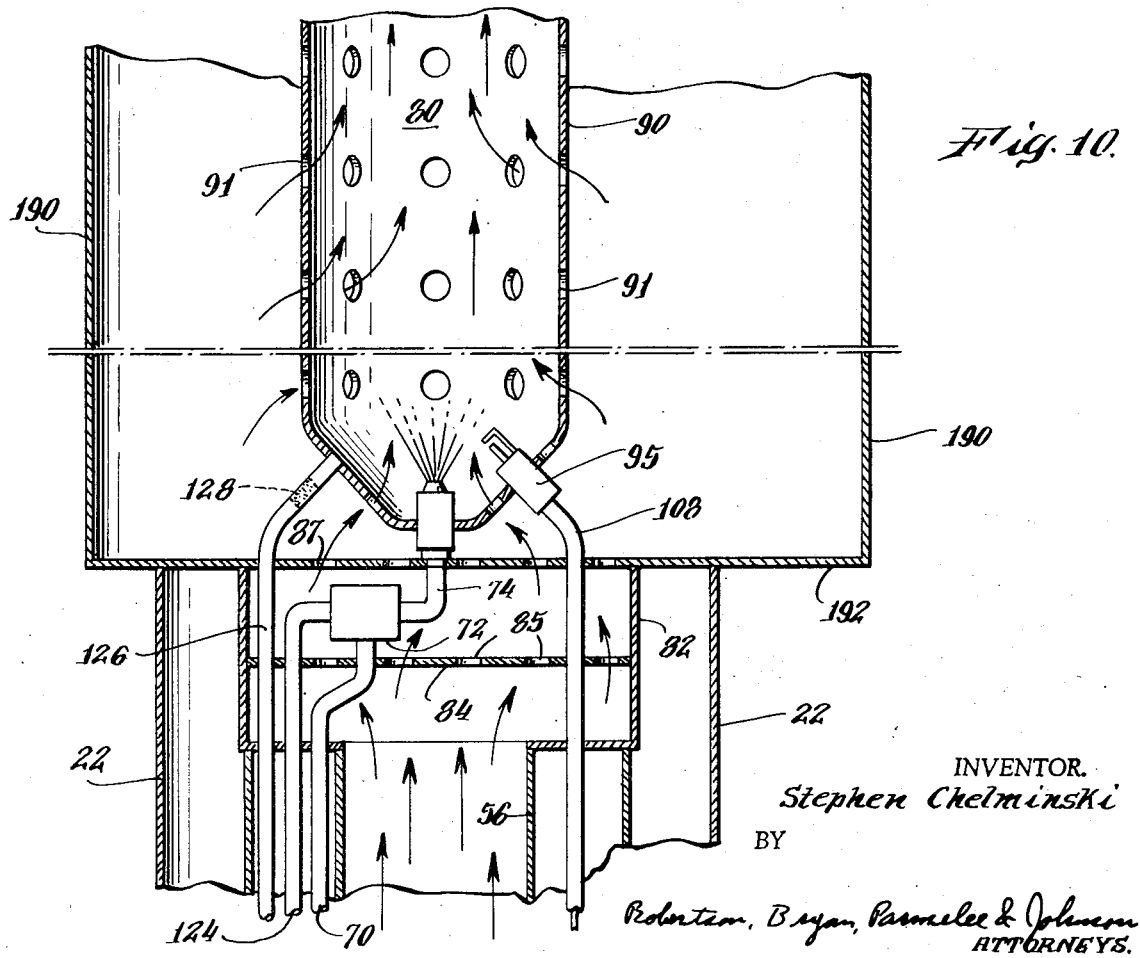

ROTARY WING AIRCRAFT LIFT AND PROPULSION METHOD AND SYSTEMS

The present invention relates to rotary wing aircraft lift and propulsion method and systems. More particularly, this invention relates to rotary wind aircraft in which there are burner thrusters mounted on the lift-producing rotor at a position spaced radially out from the axis of the rotor. An air compressor driven by the rotor through a speed-increasing gear drive supplies air at a pressure exceeding atmospheric, and this compressed air is fed into ducts in the rotor extending out to the respective burner thruster units. Fuel is supplied to these units and is burned therein producing jets of combustion gases which generate a thrust to turn the rotor about its axis, and also the rotation of the rotor serves to provide the power to drive the compressor as mentioned above.

In addition to the lift-producing rotor, there is a propeller for driving the aircraft forward or backward. The power for driving this propeller is derived from the rotation of the rotor itself. In order to control the forward or backward motion of the aircraft, the pitch of this propeller is varied as desired by the pilot, and a clutch may also be used to disengage this propeller from the rotor.

Among the advantages of the rotary wing aircraft lift and propulsion method and systems of the present invention are those resulting from the simplicity of construction which is achieved, providing longevity of the operating parts and operational safety. Moreover, the cost of construction is moderate, due to the elimination of the conventional aircraft turbine or reciprocating engine. In addition, there is a saving in weight of the aircraft as a whole.

Another advantage of the method and systems of this invention is the low torque exerted on the aircraft body, because the torque for turning the rotor is generated in the rotor itself by the thrust from the burner thruster units mounted thereon. Thus, the need for a torque-compensating tail rotor is eliminated. There is a moderate amount of torque exerted on the aircraft body due to the fact that the lift-producing rotor drives the compressor and drives the propeller. This moderate torque is compensated by a rudder which is positioned below the rotor so as to be located in the downward flow produced by the rotor and serves to deflect this downwash to provide torque compensation. Also, when the aircraft is moving forward, the vertical rudder is used to compensate for the aforementioned moderate torque. A single pilot-operated rudder control operates both the down-wash deflector rudder and the forward-motion steering rudder.

The various aspects, objects and advantages of the present invention will be more fully understood from a con-sideration of the following description in conjunction with the accompanying drawings, in which:

FIG. 1 is a side elevational view of a helicopter-autogyro aircraft embodying the present invention.

FIG. 2 is a top plan view of the aircraft of FIG. 1.

FIG. 3 is an enlarged elevational sectional view showing the air compressor driven from the rotor shaft through a speed-increasing gear transmission and showing the starter motor, fuel and electrical systems.

FIG. 4 is a plan sectional view of a burner thruster and fuel supply assembly which is located at the end of each rotor blade.

FIG. 6 is a plan view of a rotor blade and burner thruster assembly in which the axis of the burner chamber extends radially outwardly longitudinally of the rotor blade and in which the fuel is atomized by a turbine driven impeller, the fuel being metered near the hub of the rotor.

FIG. 7 is a front elevational view of the blade and burner thruster of FIG. 6.

FIG. 8 is an enlarged plan sectional view of the burner thruster of FIG. 6.

FIG. 9 is a cross sectional view taken along the line 9—9 in FIG. 7.

FIG. 10 is a modified embodiment of the burner thruster assembly of FIGS. 6 through 9.

FIG. 11 is a sectional view of the pressure-balancing fuel flow control regulator utilized in the burner thruster and fuel supply assemblies of FIGS. 4 and 10.

Figure 5:
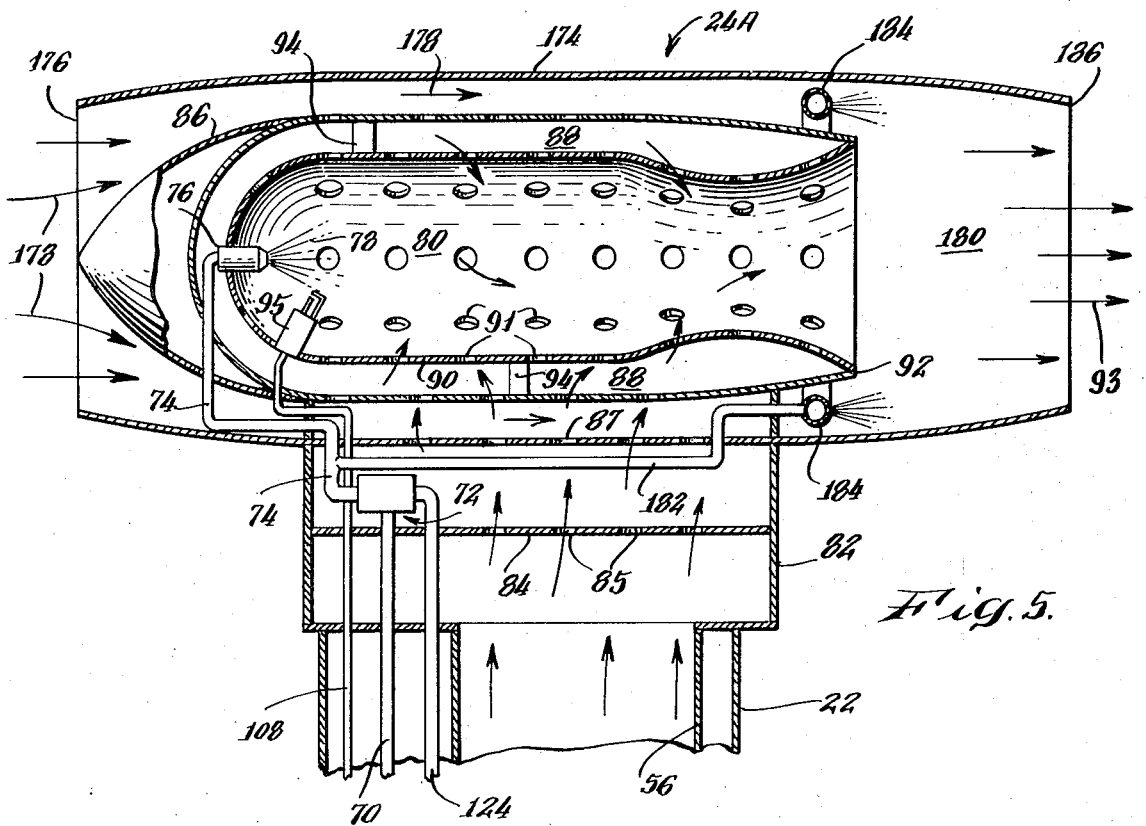
FIG. 5 is a plan sectional view of another embodiment of the burner thruster and fuel supply assembly including thrust augmentation by the use of ram air and fuel after-burning.

Referring to FIGS. 1 and 2 of the drawings in detail, the helicopter-autogyro aircraft 18 of the present invention includes a rotor 20 having blades 22 and in which the rotor is driven by jet burner thruster units 24 located at positions spaced radially from the axis of the rotor 20. In this illustrative embodiment of the invention the burner thruster units 24 are positioned at the outer tip of each blade 22. The blades 22 are mounted upon a main rotor shaft which extends down into the body 28 of the aircraft 18. The rotor shaft 26 is hollow so as to serve as a duct for compressed air as well as serving as a support member interconnecting the craft and the rotor assembly 20.

The compressed air is supplied by a compressor 30 (FIG. 3) which is driven through a speed increasing gear transmission 32 including a larger diameter gear 34 (Please see also FIG. 3) secured to the hollow rotor shaft 26 and a smaller gear 36 secured to the compressor shaft 38. A compressor impeller 40 is mounted on the shaft 38 and draws air in through an intake housing 42 having an intake port 44 through which the air flow can be throttled by a butterfly throttle valve 46.

The compressed air output from the compressor 30 is fed into an output chamber 48 which is coupled to the rotatable hollow rotor shaft 26 by means of a rotary shaft seal 50. The hollow rotor shaft 26 is mounted for rotation by lower and upper bearings 51 and 52.

The compressed air 53 flows from the chamber 48 up through the interior of the hollow rotatable shaft 26 to the hub 54 of the rotor and then out through ducts 56. One of these ducts 56 extends radially out through each blade 22 to the burner thruster unit 24 to supply compressed air thereto.

As shown in FIG. 3, the fuel 57 for the burner thruster units 24 is supplied from a fuel tank 58 through a fuel line 60 to a fuel pump 62 driven by an electric motor 63. The pumped fuel flows through a line 64 and through a rotary shaft seal 66 into the lower end of a tube fuel line 68 located concentrically at the axis of the hollow rotor shaft 26. This fuel line 68 rotates with the rotor 20. There is a rotary shaft seal 69 at the location where the rotatable fuel line tube 68 passes through the wall of the compressed air chamber 48.

The upper end of this fuel line tube 68 is connected to fuel lines 70 which extend out through the rotor blades 22 to the jet burner thruster units 24.

As shown in FIG. 4, the fuel line 70 extends out through the rotor blade 22 to a pressure-balancing fuel flow control regulator 72, which is shown in detail in FIG. 11. This regulator 72 serves to control the flow of fuel to min-imize the effect of centrifugal force due to rotation of the rotor, as will be explained in detail further below. The controlled flow of fuel leaves the regulator 72 through a line 74 extending to a fuel spray nozzle 76, providing a spray 78 within the combustion chamber 80.

The compressed air 53 flows out, as shown in FIG. 4, through the conduit 56 to a diffuser unit 82 including a perforated plate 84 having a plurality of openings 85 therein. This diffuser 82 connects to the outer jacket 86 of the burner thruster 24, and the air passes from the diffuser 82 through openings 87 into the annular air supply chamber 88 located in the space between the outer jacket 86 and the wall 90 of the combustion chamber 80. There are a multiplicity of openings 91 in the burner wall in the region where it is surrounded by the outer jacket 86 for admitting the compressed air into the combustion chamber 80. There are struts 94 extending between the jacket 86 and the burner wall 90 to hold them in position.

Vigorous burning occurs in the combustion chamber 80, and the hot gaseous products of combustion are ejected through a jet nozzle 92 forming a gaseous jet 93. The jet action produces a forward thrust by the burner thruster unit 24 and this thrust is applied to the rotor 20 at the outer end of each blade 22. Thus, the thrust produces a torque to turn the rotor 20 about the main rotor shaft 26.

It is to be noted that the thrust advantageously acts at the outer end of each blade, and thus the thrust has the maximum possible length of moment arm for producing torque about the main rotor shaft 26.

Also, it is an advantage of this arrangement that the burner thruster units 24, being located at the extreme ends of the rotor blades 22, consequently move through the air at a relatively high velocity, even when the rotor 20 is turning at a moderate R.P.M. In this way the burner thruster units 24 operate efficiently because their velocity through the air is high so as to be of the order of magnitude of the velocity of the jet 93 leaving the nozzle 92. A relatively high efficiency is obtained when the forward velocity of the thruster unit 24 is approximately equal to the rearward velocity of the jet 93 relative to the nozzle 92.

The fuel spray 78 is ignited by a spark plug 95 (FIG. 4) mounted in the burner wall 90 to ignite the fuel-air mixture in the combustion space 80. The high voltage for the spark plug 95 is supplied from a step-up spark coil transformer 96 (FIGS. 3 and 12) including a transistorized oscillator circuit in the primary (low voltage) circuit of the transformer for converting the direct current from the battery 98 into alternating current. An ignition shut-off switch 100 (FIG. 12) is located in series with the primary circuit of the transformer 96.

The high ignition voltage is supplied through an insulated wire 102 (FIG. 3 and 12) connected to a wiper contact 104 engaging a slip ring 106 located near the hub 54 of the rotor 20. As shown in FIGS. 3 and 4, there are ignition wires 108 extending out within each of the rotor blades to the spark plugs 95 in the respective burner thrusters 24.

To regulate the fuel flow, there are pressure-balancing fuel flow control regulators 72 positioned near each of the burner thrusters 24. As shown in detail in FIG. 11, the regulator 72 includes a cylindrical body 110 defining a cylinder chamber 112 containing a small piston 114 attached to a needle valve 116. This needle valve regulates the rate of flow through a valve port 118. A compression spring 120 urges the piston 114 and valve 116 toward the closed position with respect to the valve port 118. The fuel supply line 70 feeds fuel into the cylinder 112 through an inlet passage 122.

In operation, when the pressure in the fuel supply line 70 is increased in response to the pilot's control of the fuel pump and motor 62 and 63 (FIG. 3), the pressure in the chamber 112 (FIG. 11) is correspondingly increased, moving the piston 114 and valve 116 further away from the port 118. This opening movement of the valve 116 increases the feed rate of fuel through the line 74 to the fuel spray nozzle 76. In this way the burning rate of fuel is increased, thus increasing the thrust for speeding up the rotor 20 to increase the lift.

The pressure from the centrifugal force of the column of fuel in the supply line 70 (FIGS. 4 and 11) is balanced in the regulator 72 by another column of fuel of substantially the same length which exists in a pressure balancing line 124 which extends from a part 125 in the regulator 72 back toward the rotor hub 54. By virtue of the fact that the centrifugal forces in the two lines 70 and 124 balance each other, changes in rotor speed do not effect the fuel flow rate. The pilot increases the pump pressure if he wishes to increase the fuel flow rate, because the pump pressure acts against the compression spring 120.

There is a small amount of fuel which leaks past the piston 114 into the balancing line 124. This by-passed fuel bleeds near the hub 54 into a third fuel line or overflow line 126 (FIG. 4) which extends back out to the burner chamber 80. A flash-back arrestor 128 is located in the third line 126 near the burner 24. To prevent a siphoning action, there is a small air inlet into the third line 126 near the hub 54.

In order to increase the flow of compressed air when the fuel flow is increased, the butterfly valve 46 (FIG. 3) is controlled through a linkage indicated at 129 by a hydraulic control motor 130 which operates in response to the pressure being supplied by the fuel pump 62, as indicated by the dashed line 132.

Figure 12:
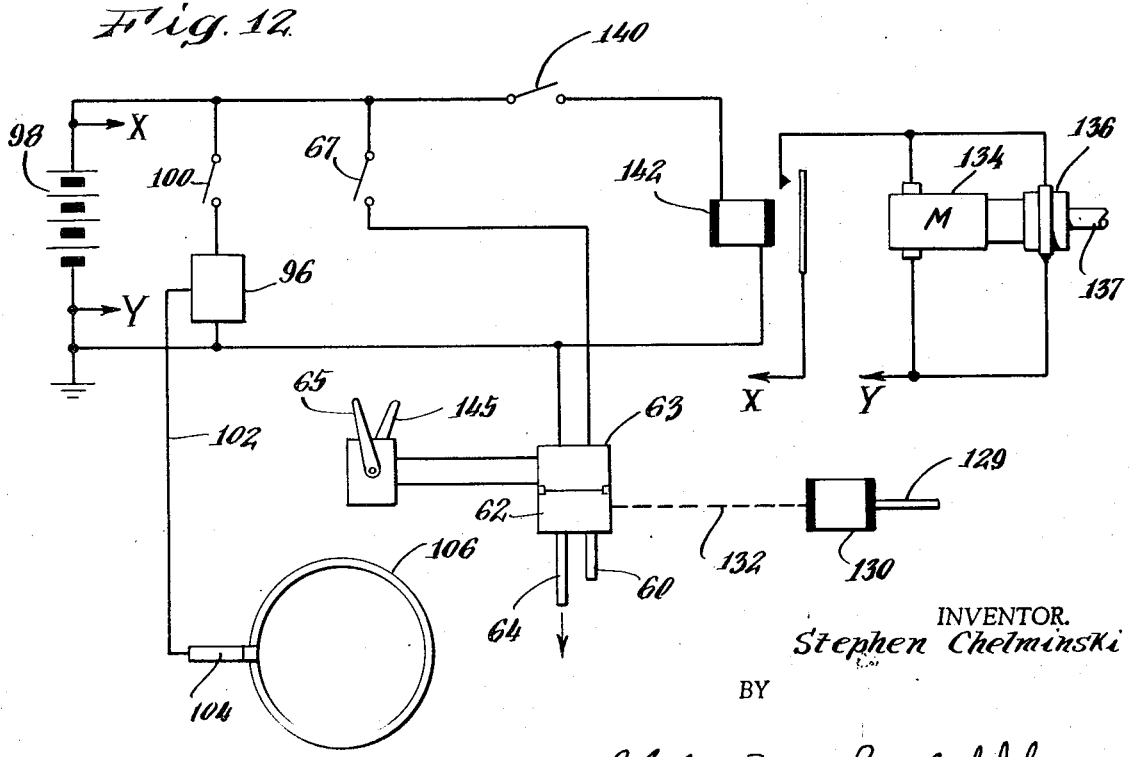
FIG. 12 is a schematic circuit diagram of the starting and ignition circuits.

For starting the helicopter-autogyro aircraft 18, there is a starting motor 134 connected through an electric clutch 136 to a gear 138 which engages the intermediate gear 36. When the pilot pushes a starter switch 140 (FIG. 12), it actuates a starting relay 142 which connects the starting motor 134 and the electrically operated clutch 136 to the battery 98, as indicated by the connection $x$ and $y$. The starter motor 134 now turns a shaft 137 which turns gear 138 to drive the compressor rotor 40 and the hollow main shaft 26 to turn the rotor 20. The ignition circuit 96–106 is turned on by the pilot closing the switch 100 and the fuel pump 62 is energized to begin pumping fuel and the air intake valve 46 is opened. The compressor 30 pumps air 53 up through the hollow rotor shaft 26 and out through the conduits 56 to the jet burner thruster units 24. The fuel pump motor 63 is controlled in speed by a rheostat control 65 which serves as the main power control for the aircraft. The fuel pump shut-off switch is shown in FIG. 12 at 67.

As the fuel starts burning in the thruster units 24, they provide thrust which helps the starter motor to increase the rotor speed. As soon as sufficient rotor speed is obtained, the pilot opens the switch 140 to shut off the starter motor 134, which also disengages the clutch 136. The pilot increases the pumping rate of the pump 62 and increases the airflow rate for quickly bringing the rotor 20 up to the desired operating speed.

An alternator 143 driven by the compressor shaft 38 serves to charge the battery 98 through a rectifier 145.

As shown in FIGS. 1 and 2 there is a driving propeller 144 which is connected by a propeller drive shaft 146 (FIGS. 1 and 3) and by a clutch 147 to a gear box 148 coupled to the rotor shaft 26. The gear box 148 is a speed-increasing transmission including hypoid gears which serve to drive the propeller 144 from the rotor shaft 26 so that the propeller 144 turns at a substantially higher rate of rotation than the rotor 20. When the clutch 147 is disengaged under the control of the pilot, the propeller 144 is disconnected from the transmission 148. The reason for the hypoid gearing in the gear box 148 is that the axis of the propeller drive shaft 146 is offset from the axis of the rotor shaft 26 so that the propeller shaft 146 may extend past the rotor shaft 26. The propeller shaft 146 is hollow and contains a push-pull rod 149 for controlling the pitch of the propeller 144. This push-pull rod is actuated by pitch control means 151 containing a double-acting hydraulic piston and cylinder mechanism for moving the push-pull rod 149.

The propeller 144 is of the type which can be feathered by the pilot so as to produce no forward thrust. Its blades can also be reversed in pitch for producing a reverse thrust. Thus, when the aircraft 18 is flying, the pilot can propel it forward and backward as desired by controlling the pitch of the blades of the propeller 144.

As shown in FIGS. 1 and 2, the propeller 144 is a pusher propeller located at the tail portion of the aircraft, but it will be understood that the scope of the invention is sufficiently broad that it may be located equally well at the forward section of the aircraft to act as a puller propeller. The presently preferred arrangement is the pusher propeller as shown.

In operating this aircraft 18, with the propeller 144 feathered, or with the clutch 147 disengaged the craft rises vertically. When the pilot wishes forward motion, he engages the clutch and alters the pitch of the blades of the propeller 144 by the hydraulic pitch control lever 145 which serves to control the flow of hydraulic fluid to the hydraulic actuator 151 so as to change the pitch to produce forward thrust. When he wishes to move backward, he reverses the pitch of the blades of the propeller 144.

As the craft is rising vertically, substantially all of the useful power from the burner thruster units 24 is used to turn the rotor 20, because the propeller 144 is essentially idle at this time, either because the blades are feathered or because the clutch 147 is disengaged, as the pilot desires. As forward flight is attained by increasing the pitch of the blades of the propeller 144, some of the useful power from the burner thruster units 24 is diverted from the rotor 20 to drive the propeller 144. As the craft 18 picks up forward speed, the rotor 20 is helped in its turning by the autogyro rotation effect, thus enabling more of the power to be diverted into the propeller 144 for driving the aircraft forward at a higher rate of speed.

Also, at higher forward speeds, some of the lift is provided by the stub wings 150.

At higher forward speeds, the craft 18 is steered toward the left or right, i.e. in yaw attitude by a vertical rudder 152 mounted on the trailing edge of a vertical stabilizer fin 154. Also, at higher forward speeds, the aircraft can be steered up and down, i.e. the longitudinal pitch of the aircraft body 28 is steered by elevators 156 mounted on the trailing edges of a pair of tail wings 158. While the craft is flying forward at higher speeds, it can be banked to the left or right, i.e. in roll attitude, by means of ailerons 155 mounted on the trailing edges of the stub wings 150.

At lower forward speeds, the pilot steers the craft 18 toward the left or right by a vertical flow rudder blade 160 which is mounted beneath a tail boom 162 that supports the outer bearing 164 for the propeller shaft 146. This vertical flow rudder blade 160 is located in the down-flow (or "downwash") produced by the rotor 20, and it can be swung by the pilot out of the vertical plan toward one side or the other. In this way, the downwash rudder blade 160 deflects the downwash toward one side or the other so as to steer the craft 18 by moving the tail in the opposite direction from that toward which the downwash is deflected.

In hovering or rising flight the torque of the rotor 20 in driving the compressor 30 exerts a moderate torque on the body 28 tending to cause the aircraft 18 to turn in the same direction as the rotor 20. The downwash rudder 160 is used to overcome this torque so as to keep the aircraft 18 headed in the desired direction.

As shown in FIG. 1, the downwash rudder 160 is pivotally mounted by bearings 163 and 165 on the tail boom 162 and includes an upper blade portion 161 located above the tail boom 162. This upper portion 161 of the downwash rudder 160 is arranged to move out of the vertical plane in the opposite direction from the lower portion 160 so as to produce a partially balanced action of the rudder blade 160, thus reducing the amount of force required to move the blade 160.

A common pilot control 166 (FIGS. 1 and 2) serves to turn the vertical rudder blade 152 and also simultaneously to move the downwash rudder 160. This simultaneous control is accomplished by utilizing conventional control means to move the vertical rudder 152 and by linking the downwash rudder 160 with the rudder 152 by a pivoted link mechanical connection 168 (FIG. 1) such that when the vertical rudder 152 is swung to the left (i.e. to turn the craft 18 toward the left) the upper blade portion 161 is moved to the right to swing the downwash rudder 160 to the left (which also tends to turn the craft to the left).

From this description, it will be seen that the pilot can fly the craft 18 vertically as a helicopter or can cause it to hover. He can fly it forward at a substantial rate of speed using the propeller 144 and can bank it and steer it, and can cause it to dive down and to climb up as may be desired. It can be flown partially in a helicopter mode and partially in an autogyro mode. As the forward speed is increased the autorotation effect increases, and correspondingly more of the power from the burner thrusters 24 is diverted to the drive propeller 144.

In the modified jet burner thruster 24A shown in FIG. 5, there is an outer housing 174 having a ram air intake opening 176 for admitting ram air 178. The ram air 178 passes around the jacket 86 and enters an afterburner chamber 180 in the tail section of the housing 174. Additional fuel for afterburning is supplied through a fuel line 182 from the regulator 72 and connected to multiple nozzles 184 located around the burner nozzle 92. The afterburner 180 serves to augment the thrust produced by the jet 93 which issues from the outlet 186 of the housing 174. It is noted that the wall of the diffuser unit 82 extends out to the jacket 86 for conducting the compressed air 53 into the annular chamber 88.

In FIGS. 6, 7, 8 and 9 is shown a rotor blade and burner thruster assembly 24B in which the axis of the burner chamber 80 extends radially outwardly longitudinally of the rotor blade 22. A streamlined housing 190 surrounds the burner wall 90 and defines an air chamber 88 surrounding the burner. The end wall 192 of the fairing 190 includes a plurality of openings 87 for admitting the compressed air flow 53 into the air chamber 88. This air passes inwardly into the burner chamber through the multiple ports 91.

The burner wall 90 extends out and curves to form a curved flow section 194 terminating in a jet nozzle 92. The gaseous jet 93 issues from this nozzle 92.

To atomize the fuel from the line 70, there is an air driven turbine and atomizer system 195, including an air-driven turbine 196 located in a streamlined shroud 198 and positioned in the center of the air duct 56 upstream of the diffuser 82. The turbine shaft 200 is connected to a cone-shaped impeller 202. The fuel from the line 70 enters a tube 204 concentric with the turbine shaft 200, and the outer end of this tube 204 discharges the fuel against the impeller 202 for atomizing it into a fuel spray pattern 78. Another shroud 206 surrounds the impeller 202 for increasing the local air velocity in the region of the spray pattern 78. Struts 208 support the shroud 198, and a bearing 210 is supported at the axis of the shroud 198 by means of struts 212. There is a seal 214 at the inner end of the tube 204, and the turbine shaft 200 extends through this seal. A cone shaped bearing 216 which is part of the atomizing system supports the shaft 200 near the impeller, and this bearing is lubricated by the fuel.

Among the advantages of the axially oriented burner chamber 80 are those resulting from the fact that centrifugal force acts longitudinally of the burner wall 90, thus reducing wall deflection stress. Also, the fuel spray pattern 78 tends to remain centered because the centrifugal force acts in an axial direction.

FIG. 10 shows a burner thruster assembly 24C which is generally similar to the assembly 24B shown in FIGS. 6–9, except that a pressure-balancing fuel flow control regulator 72 is utilized similar to the fuel supply arrangement shown in FIG. 4.

It is noted that the burner thruster assembly 24B of FIGS. 6–9 may be equipped with a pressure-balancing fuel flow control regulator in addition to the air-driven turbine and atomizing impeller system 195.

In FIG. 12 is shown the schematic circuit diagram of the starting and ignition circuits as previously described in conjunction with FIGS. 1, 2 and 3.

What is claimed is:

1. A rotary power producing system comprising a rotor, bearing means supporting said rotor for rotation about an axis, a plurality of burner thruster units mounted on said rotor at positions spaced away from said axis of rotation arranged to produce torque around said axis, air-compressor means, drive means coupling said air-compressor means to said rotor to be driven thereby, means extending from said air-compressor means to said burner thruster units for supplying air under pressure from said air-compressor means to said burner thruster units, a source of fuel, a fuel line extending from a position near said axis of rotation out to each of the burner thruster units for supplying the fuel from said source to said burner thruster units, means for igniting the fuel in said burner thruster units, said units discharging products of combustion to produce torque around said axis for turning said rotor, each of said fuel lines including a pressure-balancing fuel flow control regulator to control the flow of fuel while counteracting the effect of centrifugal force due to rotation of the rotor, said fuel flow control regulators being positioned near to the respective burner units and each including a cylinder extending at right angles to a radial line from the axis of the rotor, a piston in said cylinder dividing the cylinder into a fuel supply chamber and a balancing chamber, a fuel outlet from said fuel supply chamber communicating with the associated burner unit for supplying fuel thereto, a valve for controlling the flow of fuel through said outlet, said valve being actuated by said piston, spring means urging said valve towards its closed position, the fuel line communicating with the supply chamber, a second line extending from a position near to the axis out to each balancing chamber for balancing the effect of centrifugal force on the fuel in the fuel lines, and a fuel pump connected to each of the fuel lines for increasing the pressure in the fuel lines to increase the flow of fuel to the burner thruster units.

2. A rotary power producing system comprising a rotor, bearing means supporting said rotor for rotation about an axis, a plurality of burner thruster units mounted on said rotor at positions spaced away from said axis of rotation arranged to produce torque around said axis, air-compressor means, speed-increasing drive means coupling said air-compressor means to said rotor to be driven thereby, compressed-air conducting means extending from said air-compressor means to the hub of said rotor and ducts extending from the hub out to the respective burner thruster units for supplying compressed air to said units at a pressure exceeding atmospheric, a source of fuel, means for supplying the fuel from said source to the hub of said rotor and fuel lines extending from the hub out to the respective burner thruster units for supplying fuel to said units, means for igniting the fuel in said burner thruster units, said units having discharge means arranged in said rotor to discharge the products of combustion to produce torque for turning said rotor, power output means driven by said rotor, a pressure-balancing fuel flow control regulator positioned near each of said burner units, each of said pressure-balancing fuel flow control regulators including a cylinder extending at right angles to a radial line from the hub of the rotor, a piston in said cylinder, a fuel outlet from said cylinder communicating with the associated burner thruster unit for supplying fuel thereto, a valve for controlling the flow of fuel from said outlet, said valve being actuated by said piston, spring means urging said valve towards its closed position, the fuel line communicating with said cylinder on one side of said piston such that an increase in the pressure in said fuel line causes said piston to increase the opening of said valve, and a second line extending from a position near the hub out to said cylinder and communicating with the opposite side of said piston and containing fuel for balancing the effect of centrifugal force on the fuel in said fuel line.

3. A rotary power producing system as claimed in claim 2, in which a plurality of air diffusers are included in said rotor, said diffusers being positioned in said rotor near to the respective burner thruster units, said diffusers serving to diffuse the compressed air from said ducts into said burner thruster units.

4. A rotary power producing system as claimed in Claim 3 in which a third fuel line connects to the inner end of each of said second lines, said third lines extending out to the respective burner thruster units for carrying to the burner units any fuel which leaks past the respective pistons, and a flashback arrestor located in each of the third lines near the respective burner thruster units.

* * * * *